US010785989B2

(12) United States Patent
Rodriguez Jerez et al.

(10) Patent No.: US 10,785,989 B2
(45) Date of Patent: Sep. 29, 2020

(54) PROCESS FOR REMOVING THE FOULING DEPOSITED IN A MILK PROCESSOR UNIT AND A CLEANING SOLUTION USED THEREIN

(71) Applicant: UNIVERSITAT AUTONOMA DE BARCELONA, Bellaterra (ES)

(72) Inventors: Jose Juan Rodriguez Jerez, Barcelona (ES); Abel Guillermo Rios Castillo, Barcelona (ES); Alfons Eduard Guerrero Navarro, Barcelona (ES)

(73) Assignee: UNIVERSITAT AUTONOMA DE BARCELONA (ES)

( * ) Notice: Subject to any disclaimer, the term of this patent is extended or adjusted under 35 U.S.C. 154(b) by 153 days.

(21) Appl. No.: 16/308,880

(22) PCT Filed: Jun. 9, 2017

(86) PCT No.: PCT/EP2017/064130
§ 371 (c)(1),
(2) Date: Dec. 11, 2018

(87) PCT Pub. No.: WO2017/216062
PCT Pub. Date: Dec. 21, 2017

(65) Prior Publication Data
US 2020/0214307 A1 Jul. 9, 2020

(30) Foreign Application Priority Data

Jun. 13, 2016 (EP) .................................... 16174235

(51) Int. Cl.
*C11D 1/02* (2006.01)
*C11D 1/66* (2006.01)
*C11D 3/386* (2006.01)
*B08B 3/08* (2006.01)
*A23C 7/02* (2006.01)
*C11D 1/83* (2006.01)
*C11D 11/00* (2006.01)
*C11D 1/14* (2006.01)
*C11D 1/72* (2006.01)

(52) U.S. Cl.
CPC ................ *A23C 7/02* (2013.01); *C11D 1/02* (2013.01); *C11D 1/66* (2013.01); *C11D 1/83* (2013.01); *C11D 3/38618* (2013.01); *C11D 11/0041* (2013.01); *C11D 1/146* (2013.01); *C11D 1/72* (2013.01)

(58) Field of Classification Search
CPC .... C11D 1/02; C11D 1/16; C11D 1/72; C11D 3/38618; B08B 3/08
USPC .............. 510/238, 218, 321, 393; 134/22.11, 134/22.12, 25.3, 34, 35, 36
See application file for complete search history.

(56) References Cited

U.S. PATENT DOCUMENTS

| 4,212,761 | A | 7/1980 | Ciaccio |
|---|---|---|---|
| 5,733,473 | A | 3/1998 | Johnston et al. |
| 6,194,370 | B1 | 2/2001 | Williams et al. |
| 2003/0109406 | A1 | 6/2003 | Cooney |
| 2004/0266653 | A1 | 12/2004 | Delplancke et al. |
| 2005/0020466 | A1* | 1/2005 | Man ........................ C11D 3/046 510/392 |
| 2006/0112972 | A1* | 6/2006 | Peitersen .............. C11D 3/0042 134/26 |
| 2009/0200234 | A1* | 8/2009 | Schacht ............... C11D 11/0023 210/636 |
| 2015/0099685 | A1* | 4/2015 | Silvernail .......... C11D 17/0073 510/362 |
| 2016/0326460 | A1* | 11/2016 | Solomon ................... B08B 3/08 |
| 2017/0028449 | A1* | 2/2017 | Fernholz .............. C11D 3/3947 |

FOREIGN PATENT DOCUMENTS

EP 0342177 A3 10/1990

OTHER PUBLICATIONS

Bansal, B.; and Chen, X.D.; "A Critical Review of Milk Fouling in Heat Exchangers," Institute of Food Technologies, vol. 5, 2006, pp. 27-33.
Bell, R.W.; Sanders, C.F., "Prevention of Milkstone Formation in a High-Temperature-Short-Time Heater by Preheating Milk, Skim Milk and Whey," Journal of Dairy Science, vol. 27, No. 6, Jun. 1944, pp. 499-504.
Bower, C.K.; McGuire, J.; Daeschel, M.A., "The adhesion and detachment of bacteria and spores on food-contact surfaces," Trends in Food Science & Tech, vol. 7, May 1996, pp. 152-157.
Changani, S.D.; Belmar-Beiny, M. T.; Fryer, P.J., "Engineering and Chemical Factors Associated with Fouling and Cleaning in Milk Processing," Experimental Thermal and Fluid Science, vol. 14, 1997, pp. 392-406.
De Jong, P., "Impact and Control of Fouling in Milk Processing," Trends in Food Science & Technology, Dec. 1997, vol. 8, pp. 401-405.
Fickak, A.; Al-Raisi, A.; Chen, X.D.,"Effect of Whey Protein Concentration on the Fouling and Cleaning of a Heat Transfer Surface," Journal of Food Engineering vol. 104, 2011, pp. 323-331.
Gillham, C.R.; Fryer, P. J.; Hasting, A. P. M.; Wilson, D.I., "Cleaning-In-Place of Whey Protein Fouling Deposits: Mechanisms Controlling Cleaning," Trans ICHEME, vol. 77, Part C, Jun. 1999, pp. 127-136.
Grabhoff, A., "Enzymatic Cleaning of Milk Pasteurizers," Trans IChemE, vol. 80, Part C, Dec. 2002, pp. 247-252.

(Continued)

*Primary Examiner* — Gregory R Delcotto
(74) *Attorney, Agent, or Firm* — Luedeka Neely Group, PC

(57) ABSTRACT

The present invention relates to a process for removing the fouling deposited in a milk processor unit after a thermal processing of milk or a food product including milk at a T between 80° C. and 150° C. for at least 4 hours, including said fouling proteins, lactose, minerals and products formed therefrom, comprising the step of applying a cleaning solution on said fouling deposited in the milk processor unit. The present invention further relates to a cleaning solution for removing the fouling deposited in a milk processor unit.

13 Claims, 1 Drawing Sheet

(56) References Cited

OTHER PUBLICATIONS

Jeurnink, J. M., "Milk Fouling in Heat Exchangers," NIZO-verslagen vol. 349, 1996, pp. 1-144.
Jeurnink, J. M., Brinkman, D. W., "The Cleaning of Heat Exchangers and Evaporators after Processing Milk or Whey," Int. Dairy Journal, No. 4, 1994, pp. 347-368.
Jimenez, M.; Delaplace, G.; Nuns, N.; Bellayer, S.; Deresmes, D.; Ronse, G.; Alogaili, G.; Collinet-Fressancourt, M.; Traisnel, M., "Toward the Understanding of Interfacial Dairy Fouling Deposition and Growth Mechanisms at a Stainless Steel Surface: A Multiscale Approach," Journal of Colloid and Interface Science, No. 404, 2013, pp. 192-200.
Joergensen, L.; Klosgen, B.; Simonsen, A.C.; Borch, J.; Hagesaether, E., "New Insights into the Mucoadhesion of Pectins by AFM Roughness Parameters in Combination with SPR," Intl. Journal of Pharmaceutics, No. 411, 2011, pp. 162-168.
Jun, S.; Puri, V.M., "A 2D Dynamic Model for Fouling Performance of Plate Heat Exchangers," Journal of Food Engineering, No. 75, 2006, pp. 364-374.
Kessler, H.G.; Beyer, H.J., "Thermal Denaturation of Whey Proteins and its Effect in Dairy Technology," Int. J. Biol. Macromol, vol. 13, 1991, pp. 165-173.
Liu, W.; Fryer, P.J.; Zhang, Z.; Zhao, Q.; Liu, Y., "Identification of Cohesive and Adhesive Effects in the Cleaning of Food Fouling Deposits," Innovative Food Science and Emerging Technologies, No. 7, 2006, pp. 263-269.
Liu, W.; Zhang, Z.; Fryer, P. J., "Identification and Modelling of Different Removal Modes in the Cleaning of a Model Food Deposit," Chem. Engr. Science No. 61, 2006, pp. 7528-7534.
Rosmaninho, R.; Santos, O.; Nylander, T.; Paulsson, M.; Beuf, M.; Benezech, T.; Yiantsios, S.; Andritsos, N.; Karabelas, A.; Rizzo, G.; Muller-Steinhagen, H.; Melo, L.F., "Modified Stainless Steel Surfaces Targeted to Reduce Fouling—Evaluation of Fouling by Milk Componenyts," Journal of Food Engr. No. 80, 2007, pp. 1176-1187.
Wallhauber, E.; Hussein, M. A.; Becker, T., "Detection Methods of Fouling in Heat Exchangers in the Food Industry," Food Control, No. 27, 2012, pp. 1-10.

\* cited by examiner

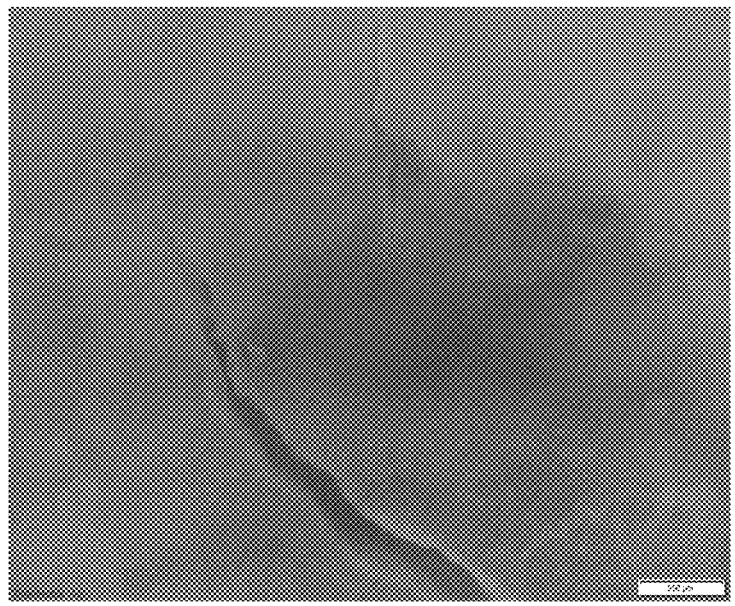

PROCESS FOR REMOVING THE FOULING DEPOSITED IN A MILK PROCESSOR UNIT AND A CLEANING SOLUTION USED THEREIN

RELATED APPLICATION

This application is a Section 371 national phase entry of PCT application PCT/EP2017/064130 filed Jun. 9, 2017.

FIELD OF THE INVENTION

The present invention relates to a process for removing the fouling in a milk processor unit by using a cleaning solution containing an enzymatic formulation and to the cleaning solution itself. In particular, said cleaning formulation consists of at least one protease and at least one amylase as enzymatic solution and a surfactant component.

BACKGROUND ART

Fouling may be defined as the unwanted formation of thermally insulating materials or deposits from process fluids onto heat transfer surfaces (Jimenez et al., 2013). Selecting the correct cleaning strategy requires an understanding of fouling and the interrelationships between surface, food product and fouling. Some research studies have been published related to the fouling process during the transformation of the milk, but in general, the way in which a milk facility is cleaned is based mainly on the empirical practice than on scientific studies (Changani et al., 1997, Liu et al. 1996).

Milk is a complex biological fluid composed of several components including whey proteins, calcium, and lipids. Under 100° C., thermal treatments in heat exchangers induce fouling of the stainless steel surfaces which proceeds essentially from the denaturation of whey proteins (Jimenez et al., 2013).

It has been suggested that the best way to completely clean pipes, after the heating process, is a double process using acid and alkali chemical products (Timperley and Smeulders, 1987; Jeurnink and Brinkmann, 1994). On the other hand, it is not clear if it is better to apply first alkali or acidic chemicals. It seems that to remove lipid residues it is better to use alkali products at high temperatures to assure a saponification of the lipids and then the complete removal by dissolution in the water. However, if the fouling has a mineral basis, it is widely accepted to firstly use an acid product to ensure the elimination of the mineral embedding (Jeurnink and Brinkmann, 1994). However, a two-stage cleaning is sometimes not completely efficient and may not achieve a clean surface (Timperley and Smeulders, 1987; Timperley et al., 1994). The cleaning of facilities is an essential step to ensure an efficient process. However, it requires additional costs to dispose of cleaning chemicals and to neutralize chemically contaminated effluents. This may be an increasingly important problem (Changani et al., 1997).

During the thermal processing of dairy products, deposit layers are often formed on the process surface of the heat exchangers. The cleaning, or removal, of such deposits is crucial for quality and safety issues (Fickak et al., 2011; Jimenez et al., 2013). Fouling is a transient process; the exchanger is initially clean and the fouling increases over time. There may be an induction period during which process conditions are not significantly affected by the fouling, followed by a fouling period during which the heat transfer coefficient decreases and the pressure drop increases (Kessler and Beyer, 1991; Changani et al., 1997). At the limit the pressure drop can become very high due to the blockage of the equipment. Such blockage can occur very rapidly (Changani et al., 1997).

Another important aspect is the microbiological contamination, the formation of biofilms, and the contamination of the end product by microorganisms growing on the fouling when the milk is treated at relatively low temperatures (Bower et al., 1996; de Jong, 1997). If the number of bacteria is elevated, after a pasteurization process, it is possible to reduce the initial count in 3 logs units. A biofilm may include billions of microorganisms, this elevated number of bacteria may affect the microbiological contamination of the processed milk, reducing the expected commercial life or increasing the consumer health risk (Bansal and Chen, 2006; Fuster-Valls et al., 2008). A correct cleaning process will result in minimal processing costs for food products when comparing to the potential economic losses and the health risk related with incorrect cleaning processes (de Jong, 1997; Bansal and Chen, 2006). There seems to be an agreement that thermal denaturation of whey protein β-lactoglobulin plays a major role in the fouling process, certainly when the temperature is below 90° C. (de Jong, 1997).

Fouling of plate heat exchangers (PHE) during milk processing is a major problem in the dairy industry, with a negative impact on operating costs and product quality (Burton, 1988). Given the economic impact of fouling in milk heat exchangers, it is not surprising that there is a considerable amount of literature available on modelling of the fouling process (Jun & Puri, 2006).

The attachment of the fouling to the surfaces is due to the denaturation of proteins and a decrease in solubility of milk salts as the temperature is increased (Kessler and Beyer, 1991; Bell and Sanders, 1994; Gillham et al., 1999; Fickak et al., 2011). Considering the different proteins present in the milk, the presence of β-lactoglobulin increases the fouling attachment process (de Jong, 1997). Consequently, a denaturation of that protein during preheating reduces the amount of protein deposit later in the process (Bell and Sanders, 1994). Perhaps for this reason, reconstituted milk exhibits much less fouling than fresh milk. It is known that 25% of the β-lactoglobulin is denatured during evaporation and drying in reconstituted milk production (Jeuruink, 1995; Fickak et al., 2011).

The amount of total solids present in the fouling on the surfaces of dairy processing equipment increases to a maximum at a concentration of 25%, thereafter the deposition decreases. This has been justified in two ways (Bell and Sanders, 1994; Gillham et al., 1999; Fickak et al., 2011):

1. Aggregation of whey protein. Up to 25% of total solids, aggregation dominates, detecting a big amount of proteins attached over the surfaces.
2. Crystallization of salts. When the total solids increase beyond 25%, fouling exceeds the solubility limit, giving a large amount of salt precipitation. Thereafter, a more compact deposit is observed.

The presence of bubbles, either air or water vapour, facilitates the rapid growth of fouling and causes a shift in protein deposit composition from whey proteins to caseins (Jeuruink, 1995).

Arnebrant et al. (1987), studying the absorption of the β-lactoglobulin onto surfaces, observed conformational changes of the protein before surface aggregation begins. Lag phases of 500 seconds and 1200 seconds were found at 78° C. and 76° C., respectively. The first material to adsorb may be responsible for the strength of the deposit-surface bonds; these may affect the cleaning rate (Arnebrant et al. 1987), but the amount of the deposit is independent of the material affected. The distribution of elements changed with depth. Minerals diffuse through the deposit, and minerals and protein layers are built simultaneously (Britten et al., 1988; de Jong, 1997).

There are two distinct types of deposits (A and B) (de Jong, 1997; Changani et al., 1997; Fickak et al., 2011; Wallhäußer et al., 2012):
A. This type is relatively soft, formed at temperatures between 75° C. and 115° C. This type of fouling is known as protein fouling.
B. This type of deposit is formed at higher temperatures; it has a granular structure, with a high mineral content. It is known as mineral fouling, but the protein concentration is also very important.

The structure of fouling becomes more rigid by increasing the protein concentration and by the inclusion of calcium aggregates (Fickak et al., 2011; Jimenez et al., 2013). The dissolution rate decreases by increasing protein concentration, almost linearly versus concentration increase, especially in the type of deposit A (Fickak et al., 2011).

The fouling adhesion to the materials is initiated with a micro-attachment, which may be divided into precipitation, particulate fouling (colloidal particles) or sedimentation (larger particles), corrosion, chemical reaction fouling, solidification, and biofilms (Wallhäußer et al., 2012).

In addition, the fouling behavior is affected by the surface material, although in different ways for the deposition or the cleaning steps (Rosmaninho et al. 2007). It is not easy to find a suitable method to monitor fouling (and cleaning) in closed systems, where a variety of conditions have to be considered. Different approaches may be used (Wallhäußer et al., 2012).

Document EP 0778880 relates to enzyme containing detergent compositions which can be used to remove food soil from typically food or foodstuff related manufacturing equipment or processing surfaces, such as heat exchanger surfaces. This composition is a stabilized solid block enzyme-containing detergent composition substantially free of an alkali metal hydroxide or a source of active chlorine and including an enzyme stabilizing amount of an aqueous soluble or dispersible stabilizing system. This document is focused on the treatment of proteinaceous films on surfaces and therefore the cleaning solution used therefore would not be suitable for treating a fouling as disclosed in the present invention.

The present inventors have surprisingly found that the cleaning solution consisting of at least one protease and at least one amylase as enzymatic solution and a surfactant component under conditions of slight basic pH allows to efficiently remove the fouling deposited in a milk processor unit after a thermal processing of milk or a food product including milk, wherein this fouling is composed by proteins, lactose, minerals and reaction products formed therefrom, optionally further containing fats. This cleaning solution has the advantages that it is a very simple solution where along with the surfactant only two types of enzymes are required, the pH conditions are relatively mild and there is no need of an additional enzyme stabilizing solution.

BRIEF DESCRIPTION OF THE DRAWINGS

FIG. 1 depicts the auto-fluorescence of fouling before cleaning. Micro-photography at 4×, 200 µm.

SUMMARY OF THE INVENTION

A first object of the invention is a process for removing the fouling deposited in a milk processor unit after a thermal processing of milk or a food product including milk at a T between 80° C. and 150° C. for at least 4 hours, including said fouling proteins, lactose, minerals and products formed therefrom, comprising the step of applying a cleaning solution on said fouling deposited in the milk processor unit.

A second object of the invention is a cleaning solution suitable to be used in the process according to the first object of the invention, i,e, for removing the fouling deposited in a milk processor unit

DETAILED DESCRIPTION OF THE INVENTION

In a first aspect, the present invention relates to a process for removing the fouling deposited in a milk processor unit after a thermal processing of milk or a food product including milk at a T between 80° C. and 150° C. for at least 4 hours, including said fouling proteins, lactose, minerals and products formed therefrom, comprising the step of applying a cleaning solution on said fouling deposited in the milk processor unit, consisting said cleaning solution of at least one protease and at least one amylase as enzymatic solution and a surfactant component, wherein said cleaning solution has a pH between 7.5 and 9.

In the present invention, when a range is given, it is to be understood that any of the values included in said range, including the mentioned ends of the range, are part of the invention. By way of example, when the pH is indicated as from 7.5 to 9, this includes 7.5, 7.6, 7.7, 7.8, 7.9, 8.0, 8.1, 8.2, 8.3, 8.4, 8.5, 8.6, 8.7, 8.8, 8.9, 9.0 and any intermediate value.

In the present invention, by "food product including milk" it is to be understood any kind of milk-based food product which contains proteins, sugars and minerals, such as milk, dairy products or a mixture of fruit juices and milk.

Although the present invention is particularly focused on a food product including milk, a non-milk-based food product is also contemplated by the present specification, providing that said food product contains proteins, sugars, preferably lactose, and minerals, such as fruit juices.

In a preferred embodiment, a milk processor unit is preferably a heat exchanger unit, more preferably made of stainless steel. In some cases, the processor unit may be just a hot surface where the fouling can be deposited, such as in the case of dried milk or liquid food products containing milk.

In a preferred embodiment, said process further comprises the step of recovering the cleaning solution from the milk processor unit.

In a preferred embodiment, the ratio (by weight) of said at least one protease to said at least one amylase is from 1:1 to 1:1.5. In particular, said ratio can be 1:1, 1:1.1, 1:1.2, 1:1.3, 1:1.4, 1:1.5 or any value intermediate value from 1:1 to 1:1.5.

As mentioned above, the pH range for the cleaning solution is between 7.5 and 9. This is very important since as shown on comparative example 1 at pH over 9 the action of the enzymes is very different. In particular, it is shown that when the pH is about 9.5 the effect of the enzymes is additive, i.e. the more different enzymes are used, the more effective is the fouling removal. The inventors have surprisingly found that when the pH is in a range between 7.5 and 9, there is no need of additional enzymes like lipases, and proteases and amylases have a greater effect on fouling removal than when they are combined with lipases (see comparative example 2). In a preferred embodiment, the cleaning solution applied in said process has a pH between 8 and 9, preferably between 8 and 8.5. It should be noted that when the pH is very slightly basic this can be compensated by an increase in the enzymes concentration in order to have a good yield in the fouling removal.

In another preferred embodiment, said at least one protease in the enzymatic solution is selected from savinase, alcalase and subtilisine A. Preferably, said at least one protease is savinase (see comparative example 3 for proteases).

In a further preferred embodiment, the surfactant in said cleaning solution comprises a mixture of a non-ionic surfactant and an anionic surfactant. Preferably, said non-ionic surfactant is selected from nonylphenoxy poly(ethyleneoxy) ethanol, polyoxyethylene and polyoxypropylene glycerine and said anionic surfactant is sodium n-octyl sulphate.

In a still further preferred embodiment, each of the enzymes included in the cleaning solution applied in said process is at a concentration between 0.005 and 10 wt. % in the whole cleaning solution, the lower limit of said range preferably being 0.01, more preferably 0.5 and even more preferably 1 wt. % in the whole cleaning solution and the upper limit of said range preferably being 5, more preferably 1 wt. % in the whole cleaning solution. Note that any value or subrange (e.g. 0.005-1 wt. %, 0.01-1 wt. %, 0.5-10 wt. % and 1-5 wt. %) found inside these ranges is suitable for the purposes of the present invention. As mentioned above, there are cases in which the concentrations of the enzymes can be increased in order to maintain the same fouling removal yield when the pH is very slightly basic.

The process of the present invention is usually carried out at a temperature between 40 and 60° C., preferably at 50° C.

The type of milk which can cause the fouling to be treated according to the process of the present invention can be skimmed milk, semi-skimmed or whole milk, preferably whole milk.

In a second aspect, the present invention relates to a cleaning solution for removing the fouling deposited in a milk processor unit comprising at least one protease and at least one amylase as enzymatic solution and a surfactant component comprising a mixture of a non-ionic surfactant and an anionic surfactant, wherein said cleaning solution has a pH between 7.5 and 9.

As shown above, when the pH is indicated as from 7.5 to 9, this includes 7.5, 7.6, 7.7, 7.8, 7.9, 8.0, 8.1, 8.2, 8.3, 8.4, 8.5, 8.6, 8.7, 8.8, 8.9, 9.0 and any intermediate value. In a preferred embodiment, the cleaning solution has a pH between 8 and 9, preferably between 8 and 8.5.

Preferably the ratio of said at least one protease to said at least one amylase is from 1:1 to 1:1.5. In a preferred embodiment, the ratio (by weight) of said at least one protease to said at least one amylase is from 1:1 to 1:1.5 In particular, said ratio can be 1:1, 1:1.1, 1:1.2, 1:1.3, 1:1.4, 1:1.5 or any value intermediate value from 1:1 to 1:1.5.

As mentioned above, the cleaning solution preferably comprises a mixture of a non-ionic surfactant and an anionic surfactant. Preferably, said non-ionic surfactant is selected from nonylphenoxy poly(ethyleneoxy) ethanol, polyoxyethylene and polyoxypropylene glycerine and said anionic surfactant is sodium n-octyl sulphate.

In another preferred embodiment, the enzymes included in the cleaning solution are at a concentration between 0.5 and 10 wt. % in the whole cleaning solution, preferably at a concentration between 1 and 5 wt. % in the whole cleaning solution.

In another preferred embodiment, said at least one protease in the enzymatic solution is selected from savinase, alcalase and subtilisine A. Preferably, said at least one protease is savinase.

It should be understood that all the embodiments disclosed above for the first object of the invention (process) can be equally combined regardless of the order as mentioned in the present application. The same applies to the second object of the invention (cleaning solution).

The following Examples are offered for illustrative purposes only and are not intended to limit the scope of the present invention in any way.

EXAMPLES

Fouling Formation
Open Surfaces

In order to evaluate the effectiveness of different chemical formulations it is essential to develop a model for reproducing fouling in the laboratory. This is a problem, because, in the literature, the process has not been standardised. Our first step was to select the kind of milk to be used. Much has been written on the implication of whey proteins, particularly related to β-lactoglobulin, but in our case we needed to reproduce the total fouling formed in order to find a formulation that could be removed it efficiently. For this reason, we used cow's milk obtained on the same day as the analysis and was maintained in constant refrigeration (4° C.).

As for the material on which the fouling was to be reproduced, we selected non-porous stainless steel coupons AISI 316 (diameter: 5 cm and thickness: 1 mm), finished with grade a 2B polish, and plain surfaces. Prior to use, the coupons were treated in accordance with European Standard EN 13697:2001 by washing in detergent (Dipol BacStop, D.I.S. DINO S. L., Madrid, Spain), rinsing in deionised water, being dried with 70% 2-propanol (Panreac Quimica S. A., Castellar del Valles, Spain) and airflow, and autoclaved for 15 minutes at 121° C. The coupons were packaged in thermo-sealed bags until use.

To avoid a loss of the milk that comes into contact with the coupon, the edges of the SS316 coupons were sealed with a self-adhesive aluminium belt, ensuring a minimum height of 0.5 cm all the way around the coupon. This formed the analysis unit (AU). The AUs were placed in an oven at 90° C. for 30 minutes to ensure that all surfaces were completely dried. The AU were then placed on a precision balance with a measurement capability of 0.1 mg to calculate the weight of the AU before fouling was formed. After this, we placed again the AU in the same oven, placing 3 ml of milk over the AU for 45 minutes until the milk had completely desiccated. The coupons were once again placed on the balance and the total desiccated milk was calculated (dry extract). 3 ml of milk were successively added to the coupon with the dry extract deposited on the SS316 coupons being measured, until 8 hours of treatment had passed. Afterwards, the adhered fouling was verified visually, the aluminium belt removed, the fouled AUs were packed into thermo-sealed plastic bags and maintained in refrigeration (5° C.) until the cleaning process. The temperature was selected to obtain a type-A fouling.

Closed Surfaces

Different models have been published in the literature; however, none of them reproduces the fouling formation at industrial scale. A reactor has been developed to ensure a constant thermal treatment on stainless steel surface.

As for the material on which the fouling was to be reproduced, we selected non-porous stainless steel discs AISI 316 (diameter: 2 cm and thickness: 1 mm), finished with grade 2B, and plain surfaces. Prior to use, the coupons were treated in accordance with European Standard EN 13697:2001 by washing in detergent (Dipol BacStop, D.I.S. DINO S. L., Madrid, Spain), rinsing in deionised water, being dried with 70% 2-propanol (Panreac Quimica S. A., Castellar del Valles, Spain) and airflow, and autoclaved for 15 minutes at 121° C. The coupons were packaged in thermo-sealed bags until use.

Coupons were then placed in an oven at 90° C. for 30 minutes to ensure that all surfaces were completely dried. The discs were then placed on a precision balance with a measurement capability of 0.1 mg to calculate the weight before fouling was formed. After this, we placed again the coupons on a Kitasato flask. The flask was then connected through a silicone tube and the flux of milk was maintained in recirculation by means of a peristaltic pump. All the system was maintained in a thermostatic bath at 90° C. for 10 hours.

Afterwards, the adhered fouling was verified visually, the fouled discs were packed into thermo-sealed plastic bags and maintained in refrigeration (5° C.) until the cleaning process. The temperature was selected to obtain a type-A fouling.

Comparative Example 1 at pH 9.5

The example was conducted under open surface fouling conditions.

The pH was adjusted by adding NaOH to 9.5 and the temperature to 50° C. We compared the fouling removal for a cleaning solution containing a surfactant (nonylphenoxy poly(ethyleneoxy) ethanol 15EO) in:

alkaline water (T), or

PT (only protease), for example Savinase, or

APT (protease+amylase), for example Termamyl as amylase and savinase as protease, or BT (protease+amylase+lipase), for example, Termamyl as amylase, savinase as protease and lipolase as lipase).

Cleaning Solution (BT)

| Ingredient | % by weight |
| --- | --- |
| nonylphenoxy poly(ethyleneoxy) ethanol 15EO | 10.0 |
| Savinase | 3.0 |
| Termamyl | 3.2 |
| Lipolase | 1.5 |

Cleaning Solution (APT)

| Ingredient | % by weight |
| --- | --- |
| nonylphenoxy poly(ethyleneoxy) ethanol 15EO | 10.0 |
| Savinase | 3.0 |
| Termamyl | 3.2 |

Cleaning Solution (PT)

| Ingredient | % by weight |
| --- | --- |
| nonylphenoxy poly(ethyleneoxy) ethanol 15EO | 10.0 |
| Savinase | 3.0 |

TABLE 1

Reduction of fouling after different cleaning treatments in alkaline conditions

| Time (minutes) | T | PT | APT | BT |
| --- | --- | --- | --- | --- |
| 0 | 1.83 g | 1.98 g | 1.92 g | 2.12 g |
| 30 | 0.68 g | 0.55 g | 0.50 g | 0.47 g |
| % fouling reduction | 62.73 | 72.25 | 73.99 | 78.05 |

Reduction of fouling on AUs after different cleaning treatments in alkaline conditions (n = 12. Surface 25 cm$^2$).
g relates to the amount of fouling The % of fouling reduction depends on the formulation used. After 30 minutes of treatment, at pH=9.5 and 50° C., the lowest fouling reduction was obtained after the treatment with alkaline surfactant (62.73%). If savinase was included, the fouling reduction was 72.25%. This represents a 10% increase in fouling removal thanks to the activity of the enzyme. However, when the fouling was observed under the microscope, an important caramelization of the lactose could be seen, which was acting as a ligand for the total fouling (see FIG. 1). That observation justified the increase of cleaning activity after the use of specific enzymes (APT). Even so, that increase was only 1.74%. Moreover, fat residues were detected in the surface of the fouling. It is therefore hypothesised that the fat acts as a water-insoluble substance requiring the removal of that layer to allow the penetration of water-soluble reagents. After using the enzymatic mixture BT, a reduction of 78.05% in the total fouling of the AU surface was observed.

Accordingly, under conditions of pH 9.5 and t=50° C. a mixture of protease, amylase and lipase provides an acceptable cleaning result at the laboratory scale.

When closed surfaces fouling were used (data not shown), total fouling formed was lower than 0.2 g, and no significant fouling removal was detected with any of the treatments, probably due to the low amount of fouling obtained.

Comparative Example 2 at pH 8.5

When the pH conditions are modified i.e. pH between 8 and 9, a reduction of the PT activity was detected and an increase of the APT activity was observed. In fact, surprisingly, the APT formulation ensure a reduction of the 87.51% (Table 2), better than BT treatment on alkaline conditions (Table 1 above). The pH is then an important factor which will affect the cleaning process and, depending of the final activity in a pilot plant, will allow the optimal formulation to ensure the best cleaning process. Moreover, the concentration selected is compatible with a lower price of the formula. The estimated cost is lower than 30€/Tm of the final cleaning solution. Moreover, the re-utilization of the solution is possible reducing thereby the final cost of the enzymatic cleaning process.

TABLE 2

Reduction of the fouling in AU after different
semi-alkaline cleaning treatments (the formulations
are the same as in comparative example 1)

| Time (minutes) | T | PT | APT | BT |
|---|---|---|---|---|
| 0 | 1.68 g | 2.29 g | 1.74 g | 2.01 g |
| 30 | 0.46 g | 0.71 g | 0.22 g | 0.61 g |
| % fouling reduction | 72.44 | 68.95 | 87.51 | 69.65 |

Reduction of the fouling in AU after different semi-alkaline cleaning treatments (n = 12. Surface 25 cm$^2$).
g relates to the amount of fouling When closed surfaces fouling were used (data not shown), total fouling formed was lower than 0.2 g. A reduction of the 100% of the fouling removal was detected only when an APT mix, adjusted to a pH 8.5 was used.

Comparative Example 3 for Proteases

To compare the activity of the proteases, an open surface fouling was used because a higher amount of fouling was obtained. Considering previous examples and the corresponding results, it was concluded that lipase was not necessary when the pH was adjusted to an optimum activity of the protease and amylase. We used then different protease enzymes to compare effectiveness. The pH was adjusted to 8.5, the cleaning temperature to 50° C. and the surfactant and amylase are absent. Even these components are absent, the results are also applicable to a composition when they are present.

The enzymes used were savinase, alcalase and subtilisin A, without including surfactant:

Proteases Used in the Experiment

| Ingredient | % by weight |
|---|---|
| Savinase (Sav) | 3.0 |
| Alcalase (Alc) | 5.0 |
| Subtilisine A (Sub) | 5.0 |

TABLE 3

Reduction of fouling on AUs after different
cleaning treatments in alkaline conditions

| Time (minutes) | Sav | Alc | Sub |
|---|---|---|---|
| 0 | 2.02 g | 1.98 g | 2.10 g |
| 30 | 0.91 g | 0.77 g | 0.49 g |
| % fouling reduction | 45.04 | 38.89 | 23.33 |

Reduction of fouling on AUs after different cleaning treatments in alkaline conditions (n = 12. Surface 25 cm$^2$).
g relates to the amount of fouling Consequently, Savinase was the enzyme with a better activity. It is also shown that the effect of the protease alone is significantly lower than when combined with amylase and surfactant.

Comparative Example 4 for Surfactants

To compare the activity of surfactants, an open surface fouling was used because a higher amount of fouling was obtained.

Comparing the effect of different surfactants, we used nonylphenoxy poly(ethyleneoxy) ethanol 15EO (NPPEE), Polyoxyethylene and polyoxypropylene glycerine (POEG+ POPG) and Sodium-n-octyl sulphate (SnOS). The protease and amylase are absent. Even these components are absent, the results are also applicable to a composition when they are present.

Surfactants Used in the Experiment

| Ingredient | % by weight |
|---|---|
| NPPEE | 10.0 |
| POEG + POPG (POG) | 10.0 |
| SnOS | 14.0 |
| POG + SnOS (10% + 14%) | 24.0 |

TABLE 4

Reduction of fouling on AUs after different
cleaning treatments in alkaline conditions

| Time (minutes) | NPPEE | POEG + POPG | SnOS | POG + SnOS |
|---|---|---|---|---|
| 0 | 1.97 g | 2.19 g | 2.02 g | 1.87 g |
| 30 | 1.28 g | 1.25 g | 1.17 g | 1.31 g |
| % fouling reduction | 64.97 | 57.08 | 57.92 | 70.05 |

Reduction of fouling on AUs after different cleaning treatments in alkaline conditions (n = 12. Surface 25 cm
g relates to the amount of fouling As observed, with a mixture of POG+SnOS the results were more optimal.

Example 5

In this example an open surface fouling was used because a higher amount of fouling was obtained. We included a mix of savinase, teramyl, POG+SnOS, adjusting the pH by adding NaOH to 8.5. Under these conditions, the obtained fouling removal was 90.04%.

Cleaning Solution Composition

| Ingredient | % by weight |
|---|---|
| Savinase | 3.0 |
| Teramyl | 3.2 |
| POG + SnOS (10% + 14%) | 24.0 |

Example 6

In this example considering CIP systems, closed surfaces fouling has been used.

In several cases, the pH of the solution is difficult to adjust, especially in CIP (cleaning in place) conditions. The pH of the cleaning formula was then adjusted to 8.5, but the water diluent was not adjusted. Currently the pH is reduced between 0.5-1 pH units. It is necessary to increase the enzymes concentration observing a reduction of the milk fouling of 87.89%.

Cleaning Solution Composition

| Ingredient | % by weight |
| --- | --- |
| Savinase | 5.0 |
| Teramyl | 6.0 |
| POG + SnOS (10% + 14%) | 24.0 |

LIST OF REFERENCES

1. Aruebrandt T., Barton K., and Nylander T. adsorption of α-lactalbumin and β-lactoglobulin on metal surfaces versus temperature. Journal of Colloid Interface Science. 1987. 119:383-390.
2. Bansal B. and Chen X. D. A critical review of milk fouling in heat exchangers. Comprehensive Reviews in Food Science and Food Safety. 2006. 5:27-33.
3. Bell K. J. and Sanders C. F. Prevention of milkstone formation in a high-temperature-short-time heater by preheating milk, skim milk and whey. Journal of Dairy Science. 1994. 27:499-504.
4. Bower C. K., McGuire J. and Daeschel M. A. The adhesion and detachment of bacteria and spores on food-contact surfaces. Trends in Food Science and Technology. 1996. 7(5):152-157.
5. Changani S. D., Belmar-Beiny M. T. and Fryer P. J. Engineering and chemical factors associated with fouling and cleaning in milk processing. Experimental Thermal and Fluid Science. 1997. 14:392-406.
6. de Jong P. Impact and control of fouling in milk processing. Trends in Food Science and Technology. 1997. 8:401-405.
7. Fickak A., Al-Raisi A., and Dong Chen X. Effect of whey protein concentration on the fouling and cleaning of a heat transfer surface. Journal of Food Engineering. 2011. 104: 323-331.
8. Fuster-Valls N., Hernández-Herrero M., Marin de Mateo M. and Rodríguez-Jerez J. J. Effect of different environmental conditions on the bacteria survival on stainless steel surfaces. Food Control. 2008. 19:308-314.
9. Gillham C. R., Fryer P. J., Hasting A. P. M., and Wilson D. I. Cleaning-in-place of whey protein fouling deposits: mechanisms controlling cleaning. Trans IChemE. 1999. 77:127-136.
10. Jeurnink T. J. M. and Brinkmann D. W. The cleaning of heat exchangers and evaporators after processing milk or whey. International Dairy Journal. 1994. 4:347-368.
11. Jeuruink T. J. M. Fouling of heat-exchangers by fresh and reconstituted milk and the influence of air bubbles. Milk Science International. 1995. 50(4):189-193.
12. Jimenez M., Delaplace G., Nuns N., Bellayer S., Deresmes D., Ronse G., Alogaili G., Collinet-Fressancourt M. and Traisnel M. Toward the understanding of the interfacial dairy fouling deposition and growth mechanisms at a stainless steel surface: A multiscale approach. Journal of Colloid and Interface Science. 2013. 404:192-200.
13. Jun A. and Puri V. M. A 2D dynamic model for fouling performance of plate heat exchangers. Journal of Food Engineering. 2006. 75:364-374.
14. Kessler H. G. and Beyer H. J. Thermal denaturation of whey proteins and its effect in dairy technology. International Journal of Biological Macromolecules. 1991. 13:165-173.
15. Liu W., Zhang Z. and Fryer P. J. Identification and modeling of different removal modes in the cleaning of a model food deposit. Chemical Engineering Science. 2006. 61:7528-7534.
16. Rosmaninho R., Santos O., Nylander T., Paulsson M., Beuf M., Benezech T., Yiantsios S., Andritsos N., Karabelas A., Rizzo G., Müller-Steinhagen H. and Melo L. F. Modified stainless steel surfaces targeted to reduce fouling-evaluation of fouling by milk components. 2007. Journal of Food Engineering. 80:1176-1187.
17. Timperley D. A. and Smeulders C. N. M. Cleaning of dairy high-temperature-short-time plate heat exchangers: comparison of single- and two-stage procedures. Journal of the Society of Dairy Techology. 1987. 40:4-7.
18. Timperley D. A., Hasting A. P. M. and de Goederen G. Developments in the cleaning of dairy sterilization plant. Journal of the Society of Dairy Technology. 1994. 47(2): 44-50.
19. Wallhäußer E., Hussein M. A., and Becker T. Detection methods of fouling in heat exchangers in the food industry. Food Control. 2012. 27:1-10.

The invention claimed is:

1. A process for removing a fouling deposited in a milk processor unit after a thermal processing of milk or a food product comprising milk at a temperature between 80° C. and 150° C. for at least 4 hours, said fouling comprising proteins, lactose, minerals and products formed therefrom, comprising the step of applying a cleaning solution on said fouling deposited in the milk processor unit, said cleaning solution consisting of at least one protease and at least one amylase as enzymatic solution and a surfactant component, wherein said cleaning solution has a pH between 7.5 and 9.

2. The process according to claim 1 wherein a ratio by weight of said at least one protease to said at least one amylase is from 1:1 to 1:1.5.

3. The process according to claim 1, wherein the cleaning solution applied in said process has a pH between 8 and 8.5.

4. The process according to claim 1, wherein the at least one protease is savinase.

5. The process according to claim 1, wherein the surfactant component is a mixture of a nonionic surfactant and an anionic surfactant.

6. The process according to claim 5, wherein said nonionic surfactant is polyoxypropylene glycerine and said anionic surfactant is sodium n-octyl sulphate.

7. The process according to claim 1, wherein each of the enzymes present in the cleaning solution applied in said process is at a concentration between 0.005 and 10 wt. % based on a total weight of the cleaning solution.

8. The process according to claim 7, wherein the enzymes present in the cleaning solution applied in said process are at a concentration between 0.01 and 1 wt. % based on a total weight of the cleaning solution.

9. The process according to claim 1, wherein the process is performed at a temperature between 40 and 60° C.

10. The process according to claim 1, wherein the fouling is caused by whole milk.

11. The process according to claim 1, wherein the fouling is deposited in a heat exchanger unit.

12. The process according to claim 1, wherein the process is performed at a temperature of about 50° C.

13. The process according to claim 11, wherein the heat exchanger unit is made of stainless steel.

* * * * *